United States Patent [19]

Hartl

[11] Patent Number: 5,622,240

[45] Date of Patent: Apr. 22, 1997

[54] COMPRESSED-AIR ACTUATED DISK BRAKE

[75] Inventor: Michael Hartl, Munich, Germany

[73] Assignee: Knorr Bremse Systeme Fuer Nutzfahrzeuge, Munich, Germany

[21] Appl. No.: 400,884

[22] Filed: Mar. 8, 1995

[30] Foreign Application Priority Data

Sep. 8, 1992 [DE] Germany .......................... 42 30 004.5
Aug. 18, 1993 [WO] WIPO ...................... PCT/DE93/00751

[51] Int. Cl.⁶ .................................................. F16D 65/16
[52] U.S. Cl. ........................................ 188/72.6; 188/72.9
[58] Field of Search ................................. 188/71.1, 72.2, 188/72.6, 72.7, 72.8, 72.9, 73.43, 369

[56] References Cited

U.S. PATENT DOCUMENTS

| 2,399,010 | 4/1946 | Eksergian et al. | 188/72.6 X |
| 3,410,372 | 11/1968 | Hodkinson et al. | 188/72.6 X |
| 5,400,875 | 3/1995 | Anthony et al. | 188/72.9 |

FOREIGN PATENT DOCUMENTS

| 4032885 | 4/1992 | Germany | 188/72.7 |
| 4212383 | 10/1993 | Germany | 188/72.7 |
| 4212406 | 10/1993 | Germany | 188/196 V |
| 4028331 | 12/1994 | WIPO | 188/72.6 |

*Primary Examiner*—Josie Ballato
*Attorney, Agent, or Firm*—Barnes & Thornburg

[57] ABSTRACT

A compressed-air actuated disk brake is disclosed comprising a caliper which reaches around a brake disk and on one side of which an application device is arranged which, when acted upon by compressed air, actuates at least one adjusting spindle adjustably arranged in a traverse, which adjusting spindle, by way of a pressure element disposed on its brake-disk-side end, acts upon the pressure plate of a brake lining which is disposed on the application side in the caliper to be displaceable with respect to the brake disk, an adjusting device, by acting upon the adjusting spindle(s), keeping the ventilating play, which changes because of the wear of the lining, essentially constant. In order to achieve that, while a high efficiency and a low hysteresis is maintained, the weight can be reduced, it is suggested according to the invention to use a fork-shaped pivoting lever in the case of which two legs extend or fork from the end region of its actuating arm, the semicircular pivot bearing as well as the bearing of the eccentric each being formed by corresponding pairs of bearings in the end regions of the legs.

10 Claims, 3 Drawing Sheets

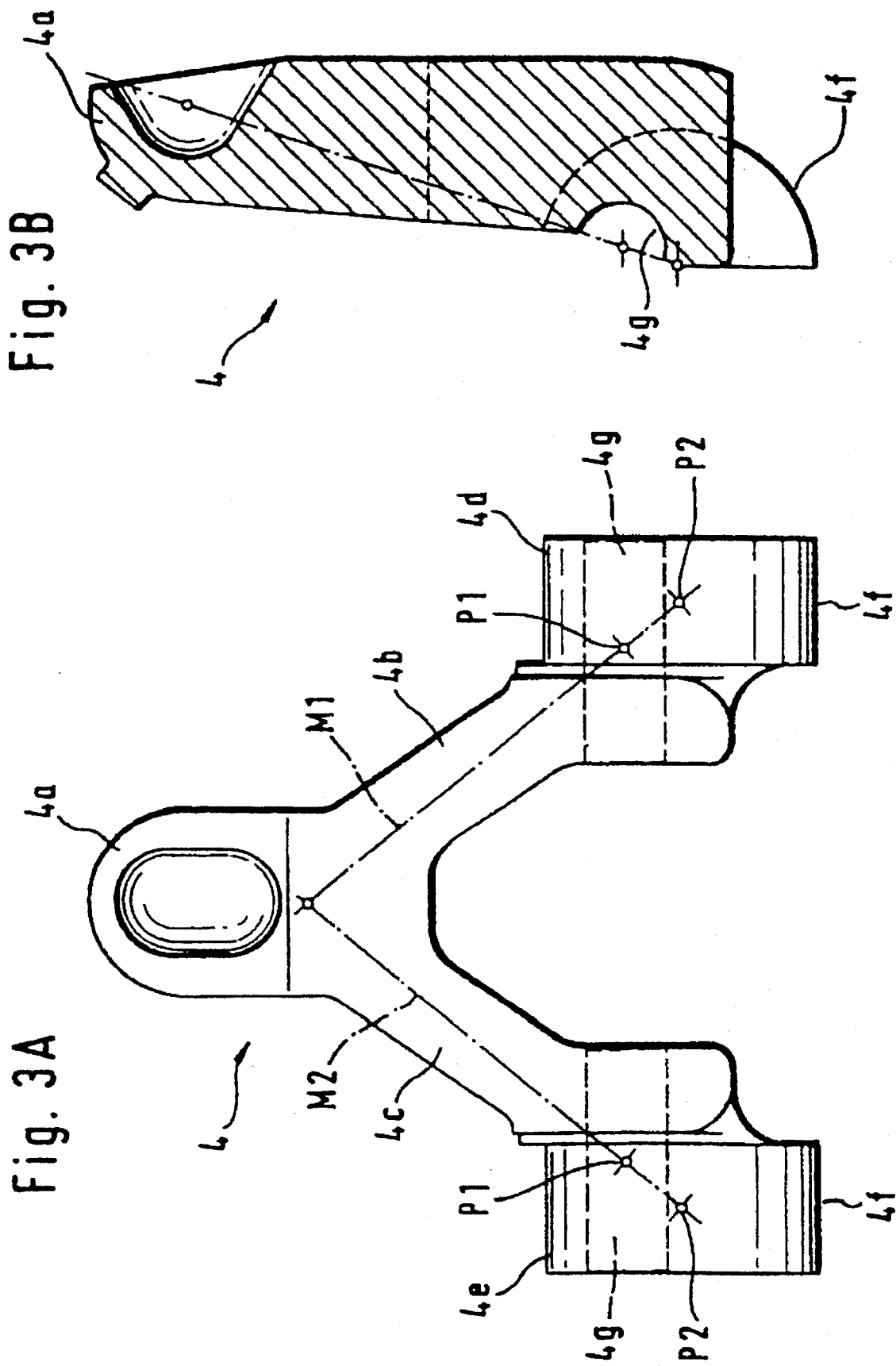

COMPRESSED-AIR ACTUATED DISK BRAKE

SUMMARY AND BACKGROUND OF THE INVENTION

The invention relates to a compressed-air actuated disk brake according to the preamble of claim 1 which is provided particularly for road vehicles and preferably for commercial vehicles.

Compressed-air actuated or pneumatic disk brakes of the above-mentioned type are known, for example, from German Patent Document DE-OS 37 16 202 as well as German Patent Document DE-OS 40 32 885. In the case of these known disk brakes, a caliper, which is disposed to be displaceable in the axial direction, reaches around a brake disk, in which case a compressed-air actuated brake application device is arranged on one side of the caliper. When the brake application device is actuated, a brake shoe situated on this side of the brake disk presses against the latter, whereupon, because of the reaction forces, the caliper is displaced in the opposite direction and, as a result, presses a brake shoe situated on the opposite side also against the brake disk.

In the case of these known disk brakes, the brake application device comprises a pivoting lever as the actuating element which, by means of an essentially semicircular pivot bearing, is disposed so that it can be swivelled about an axis of rotation which extends in parallel to the plane of the brake disk. The pivoting lever comprises an actuating arm whose end region engages with the pressure piston of a brake cylinder in such a manner that, when compressed air is admitted, a corresponding swivelling of the pivoting lever will take place. On its side facing the brake disk, the pivoting lever rests, by means of an eccentric, approximately in the longitudinal center, against a traverse structure. The traverse extends in parallel to the axis of rotation and is guided to be slidable with respect to the brake disk. At least one adjusting spindle having an external thread is adjustably screwed into a respective assigned internal thread of the traverse. Each adjusting spindle acts, by way of a pressure member disposed on its brake-disk-side end, upon the brake shoe which is disposed in the caliper on the brake application side so that it can be displaced with respect to the brake disk. The brake shoe consists of a brake lining and a metallic pressure plate which is acted upon by the pressure member of the respective adjusting spindle.

In the case of these known disk brakes, it is a basic problem that the weight must be kept as low as possible in order to minimize the unsprung masses of the vehicle. However, particularly the construction of the application device and of the caliper must be as stable and as torsionally rigid as possible in order to ensure good efficiency and a low hysteresis of the brake. It is therefore very difficult to significantly reduce the weight of the brake while maintaining the necessary qualitative characteristics. Thus, it was found, for example, that even the torsional strength of the pivoting lever becomes increasingly important because any torsion will considerably impair the running properties of the lever bearings which has a direct effect on the efficiency and the hysteresis. Pivoting levers used so far, for optimizing the efficiency and the hysteresis, have therefore been constructed to be largely massive and in one piece in order to achieve a torsional strength which is as high as possible.

It is an object of the invention to develop a compressed-air actuated disk brake according in such a manner that, while a high efficiency and a low hysteresis is maintained, a certain weight reduction can be achieved.

According to the invention, this object is achieved by the use a fork-shaped pivoting lever.

Surprisingly, tests have shown that a useful alternative to a massive pivoting lever is the use of a fork-shaped pivoting lever in which two legs extend or fork from the end region of its actuating arm a semicircular pivot bearing and the bearing of the eccentric are in each case formed by corresponding pairs of bearings in the end regions of the legs. Such a fork-shaped lever has a significantly lower weight than a massive pivoting lever so that the overall weight of the disk brake and the unsprung masses are correspondingly reduced. Furthermore, comparatively high savings of material are achieved.

However, in further tests, it was found that, in the case of such fork-shaped pivoting levers, torsional strains may nevertheless occur, specifically in the two legs. As a result, it cannot always be avoided that the (total of four) bearings of the pivoting lever and of the eccentric actuated by it have optimal running properties so that, under certain circumstances, a certain impairment of the hysteresis behavior and of the coefficient of friction will occur.

According to another aspect of the invention according to the teaching of claim 2, which is considered important, this problem is solved by the fact that the arrangement of the two bearings in each leg as well as the course of the two legs is selected such that the theoretical points of the introduction of force of these two bearings (viewed from above) are situated essentially on the center line of the respective leg, as illustrated in the top view in FIG. 3. By means of this measure, it is achieved that the introduction of force does not deviate from the center line of the leg, which has the result that virtually no torsional strains are built up in the fork-shaped pivoting lever. Therefore, no transverse stress is applied to the bearings so that these bearings operate with the optimal coefficient of friction and almost free of any hysteresis.

According to the further development of the invention, the supporting of the eccentric in the pivoting lever may take place by means of a pair of bearings arranged between the eccentric and the traverse and/or by means of a pair of bearings arranged between the eccentric and the pivoting lever, slide bearings being preferably used for these bearings. In contrast, in the case of the two semicircular pivot bearings by means of which the pivoting lever is supported in the brake housing, roller bearings are preferred. However, under certain circumstances, slide bearings may also be used here. In addition, with respect to the optimal bearings, reference is made to German Patent Application DE-OS 42 12 384, which is no prior publication. Reference is made here to the full content of the disclosure of that patent document.

In the following, the invention will be explained in detail by means of embodiments with reference to the drawing.

BRIEF DESCRIPTION OF THE DRAWINGS

FIGS. 3A and 3B are views of the basic construction of the pivoting lever according to the invention.

DESCRIPTION OF THE PREFERRED EMBODIMENTS

In order to illustrate the problems on which the invention is based, the basic construction and the method of operation of the disk brake of the above-mentioned type and its application device will first be explained here with reference to FIGS. 1 and 2. Although, the embodiment of the application device illustrated here has two spindles 72, 73, it should be pointed out that the invention can naturally also be used in the case of a single-spindle application device.

Figure 1:
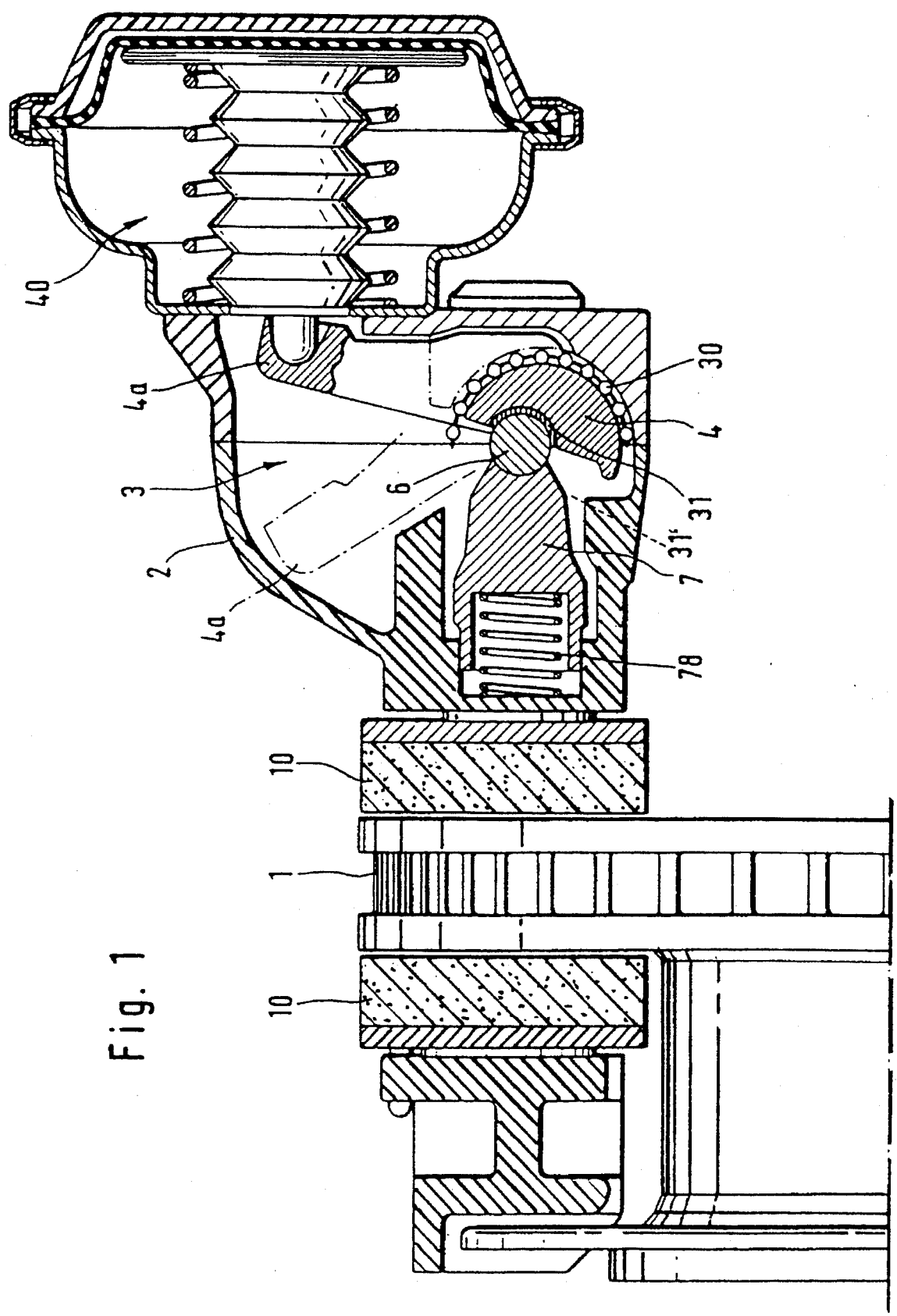
FIG. 1 is a cross-sectional view of the schematic construction of a two-spindle brake application device.
Figure 2:
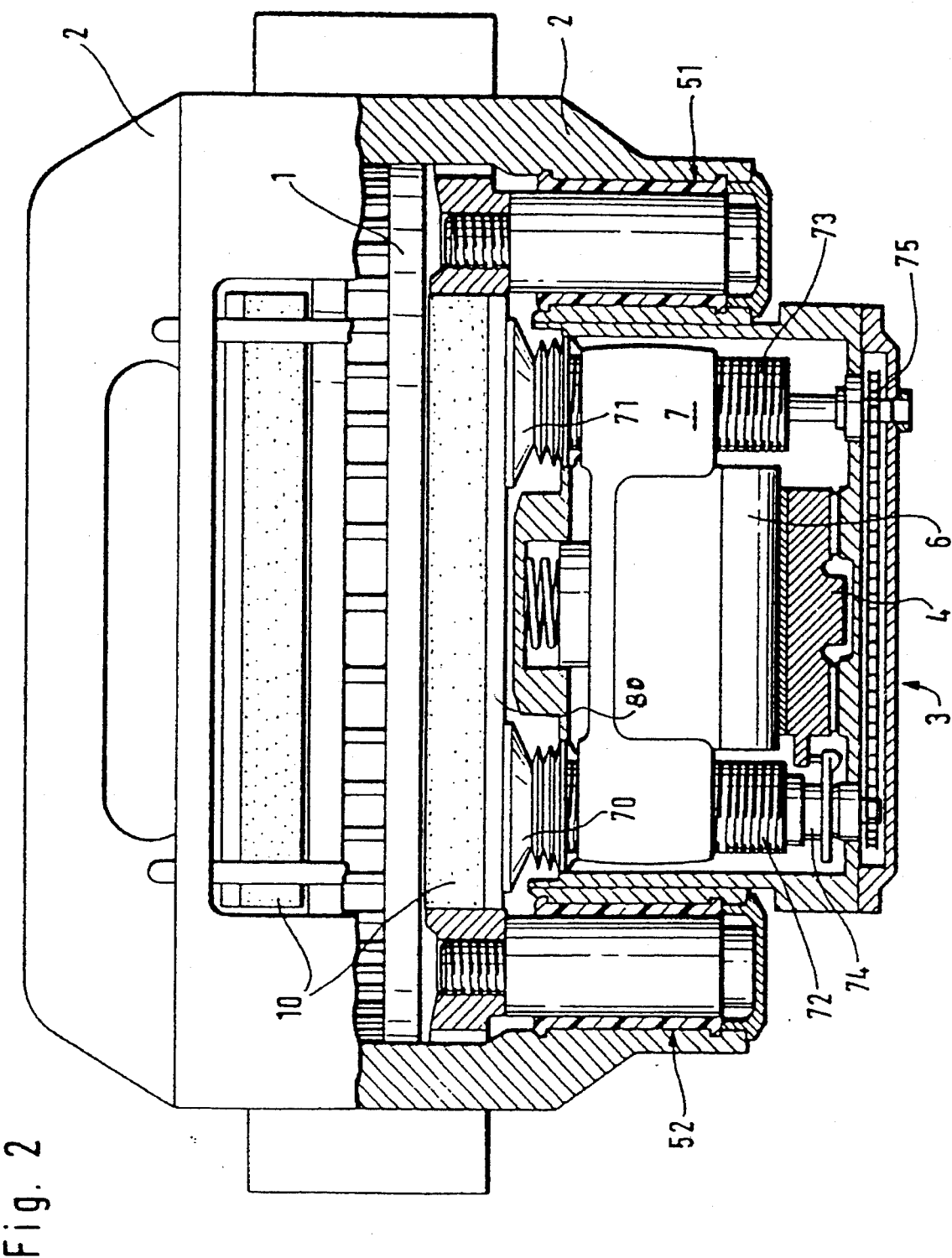
FIG. 2 is a longitudinal cut-away view of the brake application device illustrated in FIG. 1.

As illustrated in FIGS. 1 and 2, a caliper 2 reaches around an (internally ventilated) brake disk 1 which is fastened to an axle of a commercial vehicle which is not indicated in detail. According to FIG. 2, the caliper 2 is disposed on the vehicle by a rigid guide bearing 52 as well as by means of a compensating bearing 51 to be axially displaceable with respect to the brake disk 1. The construction and the operation of the caliper are otherwise known so that they do not have to be described in detail.

A (two-spindle) application device, which is schematically marked with the reference number 3, is arranged on the right side of the brake disk 1 in FIG. 1 and on the bottom side of the brake disk 1 in FIG. 2. In the caliper 2, an essentially semicircular pivot bearing 30 is provided whose axis of rotation extends in parallel to the plane of the brake disk 1 and which receives the correspondingly rounded area of a pivoting lever 4 so that the pivoting lever 4 can be swivelled in parallel to the plane of the brake disk 1. For actuating the pivoting lever 4, a brake cylinder 40 is provided which is shown only schematically and which engages with a piston in an appropriately shaped recess of an actuating arm 4a of the pivoting lever 4. When the compressed air is admitted to the brake cylinder 40, the actuating arm 4a of the pivoting lever 4 is therefore moved from its inoperative position into the position indicated by an interrupted line in FIG. 1. It should be noted that the actuating of the pivoting lever 4 may naturally also take place by way of a brake linkage so that the brake cylinder 40 may optionally also be placed at a different location if the installation space for the disk brake or its application device is limited.

The side of the pivoting lever 4 which faces away from the half-shell-shaped pivot bearing 30 is coupled, by bearing 31 and an eccentric 6 serving as a cam, with a traverse structure 7 which extends inside the caliper 2 essentially in parallel to the axis of rotation of the brake disk 1 and is displaceably disposed in this plane. On its end facing the brake disk 1, the traverse 7 has a blind-hole-type recess which is surrounded by a tube-type projection projecting in the direction of the brake disk 1. This projection of the traverse 7 is disposed in a corresponding recess of the caliper 1 so that it can be displaced at a right angle with respect to the plane of the brake disk 1 while maintaining such a play that the traverse 7 can carry out slight swivel movements in the plane of the drawing. Inside the recess, a coil spring 78 is arranged which is clamped in between the traverse 7 and the end of the caliper 2 facing the brake disk 1 and, as a result, prestresses the traverse 7 toward the pivoting lever.

As indicated particularly in the longitudinal cut-away view of FIG. 2, the traverse 7 has a bore on both sides which is, in each case, provided with an internal thread and into which one adjusting spindle 72 and 73 respectively is screwed in an adjustable manner. The external thread of the adjusting spindle is guided in a correspondingly shaped internal thread of the traverse 7. On the end of each of the adjusting spindles 72 and 73 facing the brake disk 1, a conically expanding pressure member 70 and 71 is fastened. Since, the two adjusting spindles 72 and 73 extend perpendicularly to the plane of the brake disk 1, the pressure members 70 and 71 rest, by means of their flat ends, against the pressure plate 80 of a brake lining 10. Pressure plate 80 and brake lining 10 form an exchangeable brake shoe which, particularly in the circumferential direction of the brake disk 1, by way of holding devices which are not shown, is guided to be displaceable transversely to the brake disk 1. In case, the holding devices may be assigned either to the caliper 2 or to a brake bracket.

In the interior of the adjusting spindle 72, an adjusting device 74 is arranged which, as the result of an axial toothing, is non-rotatably coupled with the adjusting spindle 72 and can be displaced in the axial direction. During each actuating of the pivoting lever 4, the adjusting device 74 is rotated by defined angular amount whereby a continuous adjusting of the brake is ensured. A gear wheel engages a corresponding axial toothing of the opposite adjusting spindle 73 and is coupled by way of a shaft with a synchronizing device 75 which rotates the interior gearwheel and therefore the spindle 73 synchronously with the adjusting device 74. As a result, the pressure member 71 is adjusted synchronously with the pressure member 70.

In the case of a single-spindle embodiment of the application device, which therefore has only a single adjusting spindle and therefore only one pressure member, the adjusting spindle is arranged, for example, in the center of the traverse 7.

In the following, the operating principle of the application device according to the invention will be briefly explained. When the brake cylinder 40 is acted upon by compressed air, the actuating arm 4a according to FIG. 1 is swivelled to the left, whereby the eccentric 6 operating on the pivoting lever 4 is also displaced to the left by a distance which is reduced corresponding to the laws of leverage. The traverse 7 is therefore pressed against the prestressing force of the coil spring 78 by this distance in the direction of the brake disk 1. The pressure members 70 and 71 fastened on the traverse 7 by the adjusting spindles 72 and 73 therefore, while overcoming the ventilating play (which in practice amounts to approximately 0.4 mm), press the brake shoe (pressure plate 80 and brake lining 10) against the brake disk 1. When the actuating arm 4a is swivelled farther to the left, the caliper, because of the force exercised upon the brake disk 1, is displaced toward the right in FIG. 1 so that finally the left brake shoe is also pressed against the brake disk 1.

If an excessively large ventilating play exists, which may, for example, be the case after an exchange of linings or in the case of an increasing wear of the brake linings, the adjusting device 74 will provide that the adjusting spindles 72 and 73 will rotate until the ventilating play has reached its desired value. In this manner, it is ensured that the disk brakes remain operable until the brake linings 10 are worn off completely.

FIGS. 3A, 3B show the basic construction of the pivoting lever according to the invention, specifically by means of a top view (A) and a partially sectional lateral view (B). According to FIG. 3a the pivoting lever 4 has the above-mentioned actuating arm 4a, in the end region of which the pressure piston of the brake cylinder 40 engages in a correspondingly shaped recess. Two legs 4b and 4c extend from this end region 4a and each end in an end region 4d and 4e respectively.

In the top side of each end region 4d and 4e, a semicircular surface 4f is formed which are used for receiving a (not shown) semicircular bearing. The pivoting lever 4 is therefore supported by means of two such bearings on the housing of the application device 3; that is, these two bearings form the bearing 30 illustrated in FIGS. 1 and 2. A roller bearing is preferably used for these bearings.

On the bottom side of each end region 4d and 4e, a semicircular recess 4g is also formed which are used for receiving a (not shown) semicircular bearing. These two bearings (31 in FIG. 1) are used for receiving the eccentrics 6; however, it is also possible to select the radius of the recesses 4g in such a manner that the eccentric 6 is received directly, that is, without the interposition of a bearing. In this case, it is recommended to provide a bearing (31 in FIG. 1) for the eccentric 6 on the traverse 7. As an alternative, it is also possible to provide one bearing respectively on the traverse side as well as on the pivoting lever side. The bearings used for supporting the eccentric 6 are preferably slide bearings, in which case suitable types of such bearings are described in detail in German Patent Document DE-OS 42 12 384 which is not a prior publication.

According to the invention, the arrangement of the two bearings in each end region 4d and 4e, that is, of the top-side and the bottom-side bearing, as well as the course of the two legs 4b and 4c is selected such that the theoretical points of the introduction of force of these two bearings marked with P1 and P2 viewed from above, are situated essentially on the center line of the corresponding leg, as indicated by the two lines M1 and M2. As a result, virtually no torsional strains are built up in the fork-shaped pivoting lever 4. Therefore, no transverse stresses are applied to the bearings so that these operate with the optimal coefficient of friction and almost free of any hysteresis. As a result of this measure, it is also possible to keep the areas of the pivoting lever 4 situated outside the center lines M1 and M2 free of material so that a very favorable weight is obtained which contributes to reducing the unsprung masses.

Concerning further characteristics and effects of the invention which are not explained in detail, reference is explicitly made to the figures.

Although the present invention has been described and illustrated in detail, it is to be clearly understood that the same is by way of illustration and example only, and is not to be taken by way of limitation. The spirit and scope of the present invention are to be limited only by the terms of the appended claims.

I claim:

1. In a compressed-air actuated disk brake comprising a caliper which reaches around a brake disk and an application device connected to the caliper on a first side of the brake disk;

the application device including a pivoting lever supported at a first end region to the caliper by an essentially semicircular pivot bearing so as to swivel about an axis of rotation parallel to the plane of the brake disk, a rotatably disposed eccentric connects the pivoting lever to a traverse member displaceable with respect to the brake disk and the caliper, and a second end region of the pivoting lever receiving a braking force input; the improvement comprising:

the pivoting lever having essentially a fork-shaped with two legs extending from the second end region of the pivoting arm and each leg terminating in a separate first end region;

each first end region engaging a respective separate semicircular pivot bearing and an eccentric;

an eccentric bearing for each eccentric; and theoretical points of the introduction of force of the pivot bearings and the eccentric are essentially on the center line of the corresponding leg.

2. Compressed-air disk brake according to claim 1, wherein the eccentric bearings are between the eccentric and the traverse.

3. Compressed-air actuated disk brake to claim 2 wherein the semicircular pivot bearings include roller bearings.

4. Compressed-air actuated disk brake according to claim 2 wherein the eccentric bearings include slide bearings.

5. Compressed-air actuated disk brake to claim 1, wherein the semicircular pivot bearings include roller bearings.

6. Compressed-air actuated disk brake according to claim 5 wherein the eccentric bearing include slide bearings.

7. Compressed-air actuated disk brake according to claim 1 wherein the eccentric bearings include slide bearings.

8. Compressed-air disk brake according to claim 1, wherein the eccentric bearings are between the eccentric and the pivoting lever.

9. Compressed-air actuated disk brake to claim 8 wherein the semicircular pivot bearings include roller bearings.

10. Compressed-air actuated disk brake according to claim 8 wherein the eccentric bearings include slide bearings.

* * * * *